US010718157B2

(12) United States Patent
Wulff et al.

(10) Patent No.: US 10,718,157 B2
(45) Date of Patent: Jul. 21, 2020

(54) METHOD FOR DETERMINING A FULLY EXTENDED POSITION OF A SCREENING BODY OF A SCREENING DEVICE

(71) Applicant: VKR Holding A/S, Hørsholm (DK)

(72) Inventors: Kenneth Midskov Wulff, Varde (DK); Peder Solsø Thomsen, Skjern (DK)

(73) Assignee: VKR HOLDING A/S, Hørsholm (DK)

( * ) Notice: Subject to any disclaimer, the term of this patent is extended or adjusted under 35 U.S.C. 154(b) by 0 days.

(21) Appl. No.: 16/186,130

(22) Filed: Nov. 9, 2018

(65) Prior Publication Data
US 2019/0145164 A1    May 16, 2019

(30) Foreign Application Priority Data

Nov. 10, 2017    (DK) .................................. 2017 70848

(51) Int. Cl.
*E06B 9/68*    (2006.01)
*E06B 9/42*    (2006.01)
(Continued)

(52) U.S. Cl.
CPC .................. *E06B 9/42* (2013.01); *E06B 9/60* (2013.01); *E06B 9/72* (2013.01); *E06B 9/88* (2013.01);
(Continued)

(58) Field of Classification Search
CPC ............... E06B 9/68; E06B 2009/6809; E06B 2009/6818; E06B 2009/6845;
(Continued)

(56) References Cited

U.S. PATENT DOCUMENTS 8,008,883 B2 * 8/2011 Hoff .................... E04F 10/0651
160/7
10,227,821 B2 * 3/2019 Pedersen .................. E06B 9/68
(Continued)

FOREIGN PATENT DOCUMENTS

DE    19861119    2/2000
EP    1106775    6/2001
(Continued)

OTHER PUBLICATIONS

1st Technical Examination including Search Report and Search Opinion dated May 23, 2018 issued in connection with Danish Patent Application No. 2017 70848, pp. 1 to 4.

*Primary Examiner* — Katherine W Mitchell
*Assistant Examiner* — Jeremy C Ramsey
(74) *Attorney, Agent, or Firm* — Merek Blackmon & Voorhees LLC

(57) ABSTRACT

A method for determining a fully extended position of a screening body (14) of a screening device (12) for a roof window. The screening device (12) comprises a control unit comprising a data storage device, an electric motor (18) comprising a tachometer (181), a roller tube (15), a screening body (14) and a first and a second spring element (164, 174). The method comprises the steps of driving the screening body (14) from a fully retracted position to a fully extended position, in which the spring elements (164, 174) are tensioned to a first tension level, $T_1$, stopping the electric motor (18) at a point at which the spring elements (164, 174) are tensioned to a second tension level, $T_2$, above the first tension level, $T_1$, measuring the number of revolutions, $R_d$, of the roller tube (15) necessary to drive the screening body (14) to the said position at which the motor (18) is stopped, storing the measured number of revolutions, $R_d$, in the data storage device, measuring the number of revolutions, $R_b$, of the roller tube, that a release of a tension corresponding to (Continued)

the difference, $\Delta T$, between the first tension level, $T_1$, and the second tension level, $T_2$, will cause the roller tube (15) to move back towards the fully retracted position, storing the number of revolutions, $R_b$, in the data storage device, and calculating and storing in the data storage device a value $R=R_d-R_b$.

8 Claims, 4 Drawing Sheets

(51) Int. Cl.
*E06B 9/72* (2006.01)
*E06B 9/60* (2006.01)
*E06B 9/88* (2006.01)
*G01P 3/46* (2006.01)

(52) U.S. Cl.
CPC .......... *E06B 2009/6854* (2013.01); *E06B 2009/6872* (2013.01); *E06B 2009/725* (2013.01); *G01P 3/465* (2013.01)

(58) Field of Classification Search
CPC ..... E06B 2009/6872; E06B 2009/6881; E06B 9/72; E06B 9/56; E06B 9/62
See application file for complete search history.

(56) References Cited

U.S. PATENT DOCUMENTS

| | | |
|---|---|---|
| 2007/0144682 A1 | 6/2007 | Drew |
| 2013/0153161 A1* | 6/2013 | Haarer ............ E06B 9/42 160/293.1 |
| 2014/0090787 A1* | 4/2014 | Colson ............ E06B 9/82 160/7 |
| 2017/0211326 A1 | 7/2017 | Mugnier |
| 2017/0226797 A1 | 8/2017 | Birkkjaer |

FOREIGN PATENT DOCUMENTS

| | | |
|---|---|---|
| EP | 2754843 | 7/2014 |
| EP | 3091168 | 9/2016 |
| EP | 3121364 | 1/2017 |
| EP | 3205808 | 8/2017 |
| EP | 3219898 | 9/2017 |
| WO | WO9907974 | 2/1999 |
| WO | WO0047858 | 8/2000 |
| WO | WO2004070157 | 8/2004 |
| WO | WO2005008013 | 1/2005 |
| WO | WO2006048014 | 5/2006 |
| WO | WO2007110072 | 10/2007 |
| WO | WO2015028031 | 3/2015 |
| WO | WO2017089863 | 6/2017 |

* cited by examiner

METHOD FOR DETERMINING A FULLY EXTENDED POSITION OF A SCREENING BODY OF A SCREENING DEVICE

CROSS-REFERENCE TO RELATED APPLICATION

The present application claims the priority under 35 U.S.C. 119 of Danish Application No. PA 2017 70848, filed on Nov. 10, 2017, which is hereby incorporated herein by reference in its entirety.

TECHNICAL FIELD

The present invention relates to a method for determining a fully extended position of a screening body of a screening device of the type adapted for mounting on a frame structure with frame members comprising top and bottom members as well as side members and lining an opening in a building, in particular a door or a window, the screening device comprising a top element, the top element comprising a roller tube, a screening body attached to the roller tube, a first end section comprising a first spring element and a second end section comprising a second spring element, a bottom element attached to the screening body, an end stop adapted for abutment with the bottom element in a fully extended position of the screening body, in which all of the screening body is rolled off of the roller tube, an electric motor connected to and adapted for rotating the roller tube, the first spring element and the second spring element such as to drive the screening body between a fully retracted position, in which all of the screening body is rolled onto the roller tube and the fully extended position of the screening body while tensioning or relaxing the first spring element and the second spring element, the electric motor comprising a tachometer, and a control unit adapted for controlling the electric motor, the control unit comprising a data storage device.

The invention further relates to a method for operating a screening device of the above type following determination of the fully extended position of the screening body of the screening device.

As used herein the term "operation" used in the connection operation of the screening device is intended to mean the process of moving the screening body from a fully retracted position of the screening body, in which all of the screening body is rolled onto the roller tube, to a partly or fully extended position of the screening body and back to the fully retracted position of the screening body.

BACKGROUND ART

A well-known problem in relation to screening devices of the above mentioned type lies in the risk of the screening body of the screening device sagging and/or wrinkling during operation. If the screening body of the screening device is caused to sag and/or wrinkle during operation there is a risk of the screening body getting damaged or getting stuck. This in turn may damage or jam the driving mechanism. Furthermore, the appearance of the screening device in the fully extended position may become aesthetically un-pleasing for the user. In screening devices operated by means of an electric motor it is therefore essential that the control system is enabled to determine and/or detect the fully extended position of the screening body of the screening device.

In the prior art, various methods have been suggested in an attempt of alleviating the above problem. For instance, EP 3 121 364 A1 describes a method for controlling a driving unit of a roller shutter in which a learning process is employed in order to enable the controller to detect the fully extended position and the fully retracted position of the screening body. In the learning process the controller drives the screening body between its fully extended position and its fully retracted position a predetermined number of times, such as four times, and in doing so detects when a threshold of for instance a torque or an intensity of the current drawn by the electric motor driving the screening body is exceeded within a predetermined time span and registers the corresponding position of the screening body. The position of the screening body may, for instance, be defined as a number of revolutions of the roller tube of the screening device.

However, the prior art methods have the drawback of being excessively cumbersome and time consuming to perform. Furthermore, the prior art methods pose a significant risk of inaccurate detection of the fully extended position of the screening body. Therefore, in the prior art methods, a risk of sagging and/or wrinkling of the screening body of the screening device in the fully extended position is nevertheless still occurring, and in consequence the screening body may still wrinkle or get stuck.

Thus, there is a desire to propose an improved method of the type mentioned by way of introduction, with which the above drawbacks are more fully alleviated.

SUMMARY OF INVENTION

It is therefore the object of the invention to provide an improved method for determining a fully extended position of a screening body of a screening device, and more particularly such a method which may be performed automatically by a control device of the screening device in a simple and straight forward manner, and which method to a wide extend or even fully ensures that sagging and/or wrinkling of the screening body of the screening device is avoided, thus ensuring both a smooth operation of the screening device in which the screening body does not wrinkle or get stuck and an aesthetically pleasing appearance of the screening device in the fully extended position.

In a first aspect of the invention the above and other objects are achieved by means of a method of the type mentioned by way of introduction and comprising the steps of:

a) rotating, by means of the electric motor, the roller tube such as to drive the screening body and the bottom element from the fully retracted position to the fully extended position of the screening body, in which the first spring element and the second spring element are tensioned to a first tension level, $T_1$, and the bottom element abuts the end stop, b) stopping the electric motor when the current drawn by the electric motor reaches a breaking current corresponding to a predetermined current level above the current level needed to drive the screening device, at which point the first spring element and the second spring element are tensioned to a second tension level, $T_2$, above the first tension level, $T_1$, c) measuring, by means of the tachometer, the number of revolutions, $R_d$, of the roller tube necessary to drive the screening body and the bottom element from the fully retracted position to the position of the screening body at which the motor is stopped in step b), d) storing the measured number of revolutions, $R_a$, in the data storage device, e) measuring by means of the tachometer the number of revolutions, $R_b$, of the roller tube, that a release of a tension of the first spring element and the second spring element corresponding to the difference, $\Delta T$, between the first tension level, $T_1$, and the second tension level, $T_2$, will cause the roller tube to move back towards the fully retracted position, f) storing the measured number of revolutions, $R_b$, in the data storage device, and g) calculating and storing in the data storage device a value $R=R_a-R_b$.

Thereby, and particularly in virtue of the steps of measuring by means of the tachometer the number of revolutions, $R_b$, of the roller tube, that a release of a tension of the first spring element and the second spring element corresponding to the difference, $\Delta T$, between the first tension level, $T_1$, and the second tension level, $T_2$, will cause the roller tube to move back towards the fully retracted position, storing the measured number of revolutions, $R_b$, in the data storage device, and calculating and storing in the data storage device a value $R=R_a-R_b$, a method for determining a fully extended position of a screening body of a screening device is obtained which may be performed automatically by a control device of the screening device in a simple and straight forward manner.

Since the release of the difference, $\Delta T$, in tension levels will cause the screening body to be stretched out, such a method furthermore to a very high extent or even completely ensures that sagging and/or wrinkling of the screening body of the screening device is avoided, thus ensuring both a smooth operation of the screening device in which the screening body does not wrinkle or get stuck and an aesthetically pleasing appearance of the screening device in the fully extended position.

It has turned out that in practice a delay may sometimes occur before the difference, $\Delta T$, in tension levels is actually released by the first spring element and the second spring element.

Therefore, in an embodiment step e) includes performing the said measurement over a time span taking into account a delay in time with respect to the point of time at which the electric motor is stopped in step d), with which the release of a tension of the first spring element and the second spring element corresponding to the difference between the first tension level, $T_1$, and the second tension level, $T_2$, occurs or may occur.

Thereby, it is ensured that the said delay, any time occurring in connection with a determination or redetermination of the fully extended position of the screening body of the screening device, is taken into due account. Thus, a correct measurement of the number of revolutions, $R_b$, and consequently a correct calculation of the value R is always obtained, which in turn ensures that the determination or redetermination of the fully extended position of the screening body of the screening device is always performed correctly.

In an embodiment the method according to the invention comprises the further steps of counting the number of operations of the screening device performed, and repeating steps a) to g) following a predetermined number of operations of the screening device to obtain a corrected version, $R_{corr}$, of the value R.

Thereby, redetermination of the fully extended position of the screening body of the screening device of the screening device with suitable intervals is ensured to always ensure correct operation of the screening device.

In an embodiment the predetermined number of operations is 200, 500 or 1000.

Thereby, redetermination of the fully extended position of the screening body of the screening device of the screening device with suitable short intervals is ensured to always ensure correct operation of the screening device.

In a second aspect of the invention the above and other objects are achieved, also for operations of the screening device following the first operation in which the fully extended position of the screening body of the screening device is determined, by means of a method for operating a screening device of the above type following determination of the fully extended position of the screening body of the screening device, where the method comprises the steps of performing the method according to the first aspect of the invention to obtain a value R, and, for operations of the screening device following the performance of the method according to the first aspect of the invention, controlling the electric motor to drive the screening body and the bottom element from the fully retracted position of the screening body towards the fully extended position of the screening body by moving the roller tube a number of revolutions being equal to the value R or equal to a fraction of the value R.

In a third aspect of the invention the above and other objects are achieved, also for operations of the screening device following an operation in which the fully extended position of the screening body of the screening device is re-determined, by means of a method for operating a screening device of the above type following redetermination of the fully extended position of the screening body of the screening device, where the method comprises the steps of performing the method according to the first aspect of the invention to obtain a corrected version, $R_{corr}$, of the value R, and, for operations of the screening device following the performance of the method according to the first aspect of the invention, controlling the electric motor to drive the screening body and the bottom element from the fully retracted position of the screening body towards the fully extended position of the screening body by moving the roller tube a number of revolutions being equal to the corrected version, $R_{corr}$, of the value R or being equal to a fraction of the corrected version, $R_{corr}$, of the value R.

BRIEF DESCRIPTION OF DRAWINGS

In the following description embodiments of the invention will be described with reference to the schematic drawings, in which.

DESCRIPTION OF EMBODIMENTS

Figure 1:
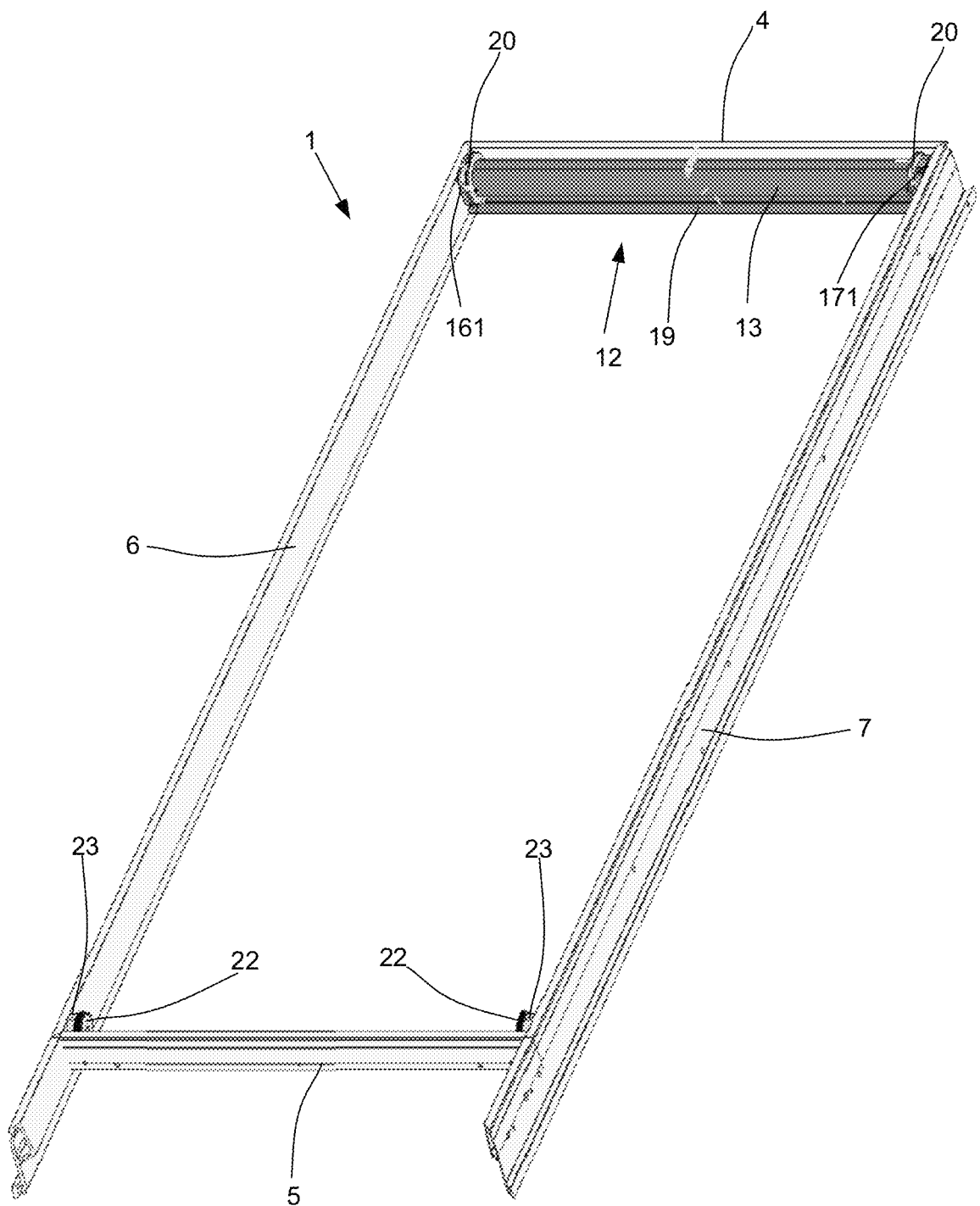
FIG. 1 is a perspective view of a roof window comprising a screening device.
Figure 2:
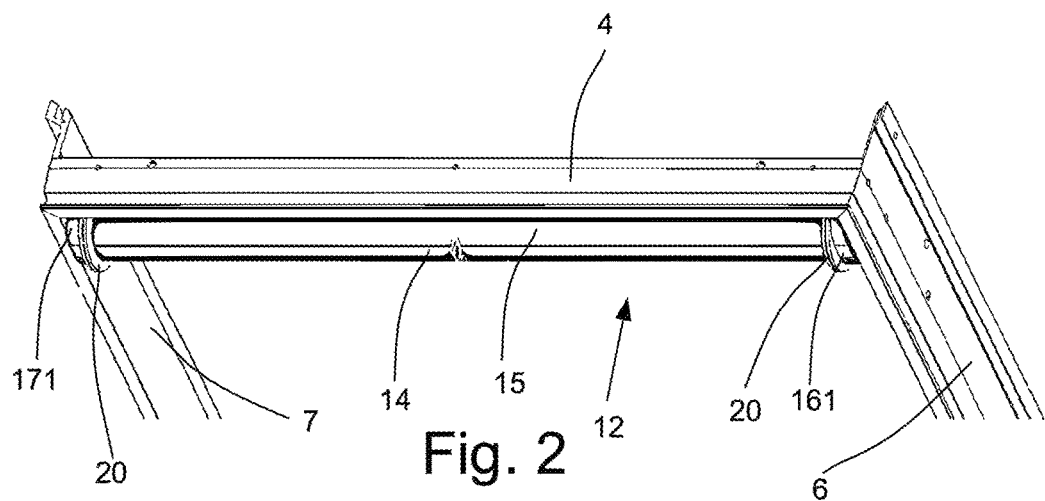
FIG. 2 is a close up of the top element and screening device of FIG. 1 and comprising a roller tube, the frame member of the roof window being shown.

Referring initially to FIGS. 1 and 2, a first embodiment of a screening device 12 mounted in a roof window 1 is shown. The roof window 1 shown in FIG. 1 is adapted for mounting in an inclined roof. The roof window 1 comprises a frame 2 and an openable sash supporting a glass pane. For the sake of simplicity, the openable sash and the glass pane are omitted on FIG. 1. In the embodiment shown, the roof window is of the kind shown and described in for instance Applicant's WO 2015/028031 A1; however, the principle underlying the invention is applicable to all kinds of roof windows, in that the sash may be top hung, centre hung, have hinge axis at position between the top and centre or of the kind that is top hung during normal operation but which pivots for cleaning by means of an intermediate frame. The frame 2 comprises a top frame member 4, a bottom frame member 5 and two side frame members 6, 7. The sash comprises a top sash member, a bottom sash member and two side sash members.

The screening device 12 is in the embodiment shown is installed at the top frame member 4 of the roof window 1. The screening device 12 may in principle be any feasible type of screening device 12. In the embodiment shown the screening device is a roller blind. In another embodiment the screening device may be a roller shutter. It is noted that a screening device 12 according to the invention may also be mounted at other frame members of the roof window, or on a façade window or a door.

Figure 3:
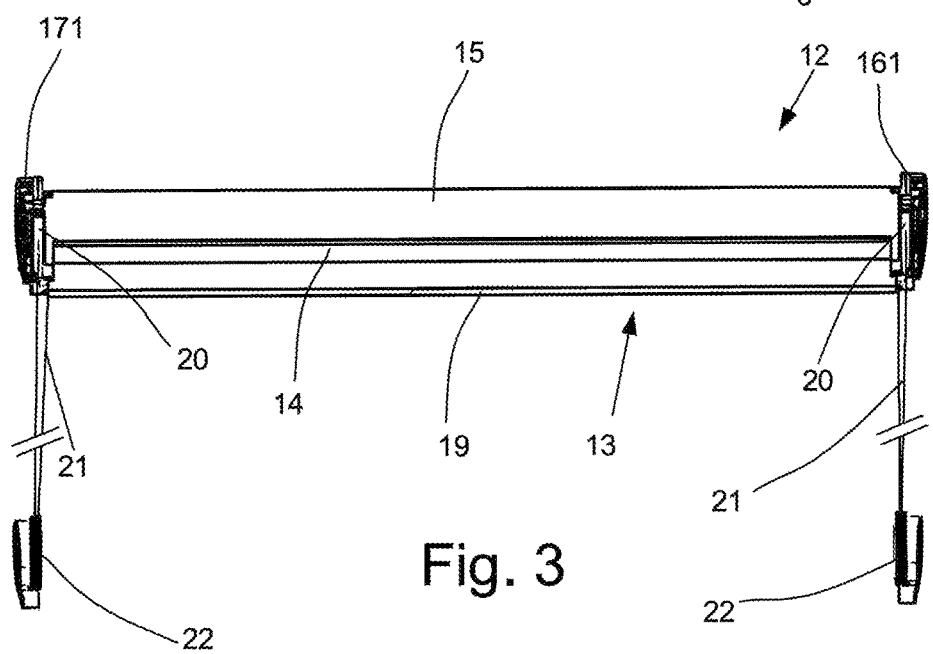
FIG. 3 is a close up of the top element and screening device of FIG. 1 and comprising a roller tube, wires and return pulleys.
Figure 4:
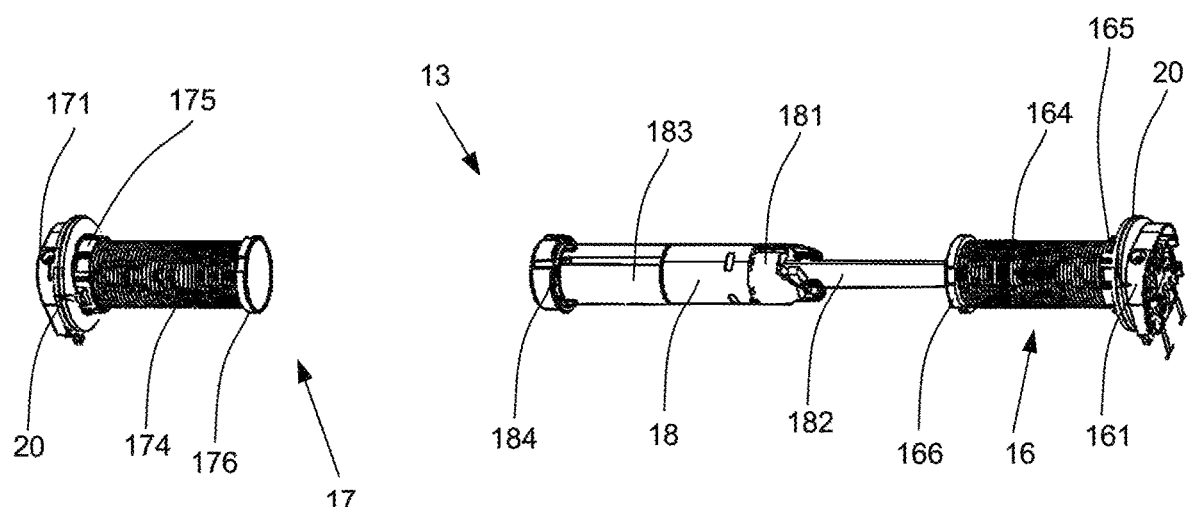
FIG. 4 is a partially exploded view of the top element of the screening device of FIG. 1, the roller tube and thus also the screening body being removed for the sake of simplicity.

Turning now also to FIGS. 3 and 4, an embodiment of a screening device 12 according to the invention will be described in more detail. The screening device 12 generally comprises a screening body 14 and a top element 13 with two end sections 16, 17. The screening device 12 is connected to the side frame members 6 and 7 at the end sections 16, 17 of the top element 13 by means of supporting means including a set of mounting brackets (not visible in FIGS. 1 and 2) fastened to the respective side frame member 6, 7 cooperating with end sections 16, 17 as will be described in further detail below. The set of mounting bracket may be fastened to the frame at the factory such that the roof window is prepared for subsequent mounting of the screening device, and possibly the screening device 12 may be pre-mounted at the factory as well. In a manner known per se the screening body 14 is wound on a roller tube indicated by reference numeral 15 in FIGS. 2 and 3, but in fact hidden behind the screening body 14. In FIG. 4, the roller tube 15 and thus also the screening body 14 has been removed for easy readability. In the embodiment shown, the screening device 12 further comprises a bottom bar 19 and two winding wheels 20. The winding wheels 20 are adapted for receiving a respective wire 21 (FIG. 3) which is wound onto the winding wheels 20 when pulling up the screening body 14 and out from the winding wheels 20 when pulling down the screening body 14. To this end the screening device 12 further comprises return pulleys 22 (FIG. 3) around which the wires 21 are lead and returned to the bottom bar 19.

As shown in FIG. 4 the screening arrangement further comprises a motor 18, in the embodiment shown an electric motor, adapted for driving the screening device 12. To this end the motor 18 is connected to the winding wheels 20 via a suitable transmission such as to enable moving the screening body 14 between a fully retracted position, in which the screening body 14 does not cover the glass pane of the window, and in the embodiment shown is wound onto a roller tube 15, and a fully extended position, in which the screening body 14 covers substantially all of the glass pane of the window. The motor 18 comprises in the embodiment shown a tachometer 181, a printed circuit board 182 and a planetary gear 183. The motor 18 is connected to and adapted for rotating the roller tube 15. More particularly, the motor 18 is connected to a rotatable cap 184, which in turn is connected to the roller tube 15 at an inner side of the roller tube 15 such that the motor 18 in operation may rotate the roller tube 15. The printed circuit board 182 comprises a data storage device adapted and arranged for being in data communication with the tachometer 181 and a control device adapted and arranged for being in data communication with the tachometer 181 and with the data storage device.

Referring still to FIG. 4, each end section 16 and 17 generally comprises a respective end piece 161 and 171, a respective inner piece (not shown on FIG. 4) and a respective rod element (not visible on FIG. 4). The rod element of the end section 16 connects the end piece 161 and the inner piece of the end section 16, and the rod element of the end section 17 connects the end piece 171 and the inner piece of the end section 17. The end piece 161 and the inner piece of the end section 16 are connected to opposite longitudinal ends of the rod element of the end section 16, and the end piece 171 and the inner piece of the end section 17 are connected to opposite longitudinal ends of the rod element of the end section 17.

Figure 5:
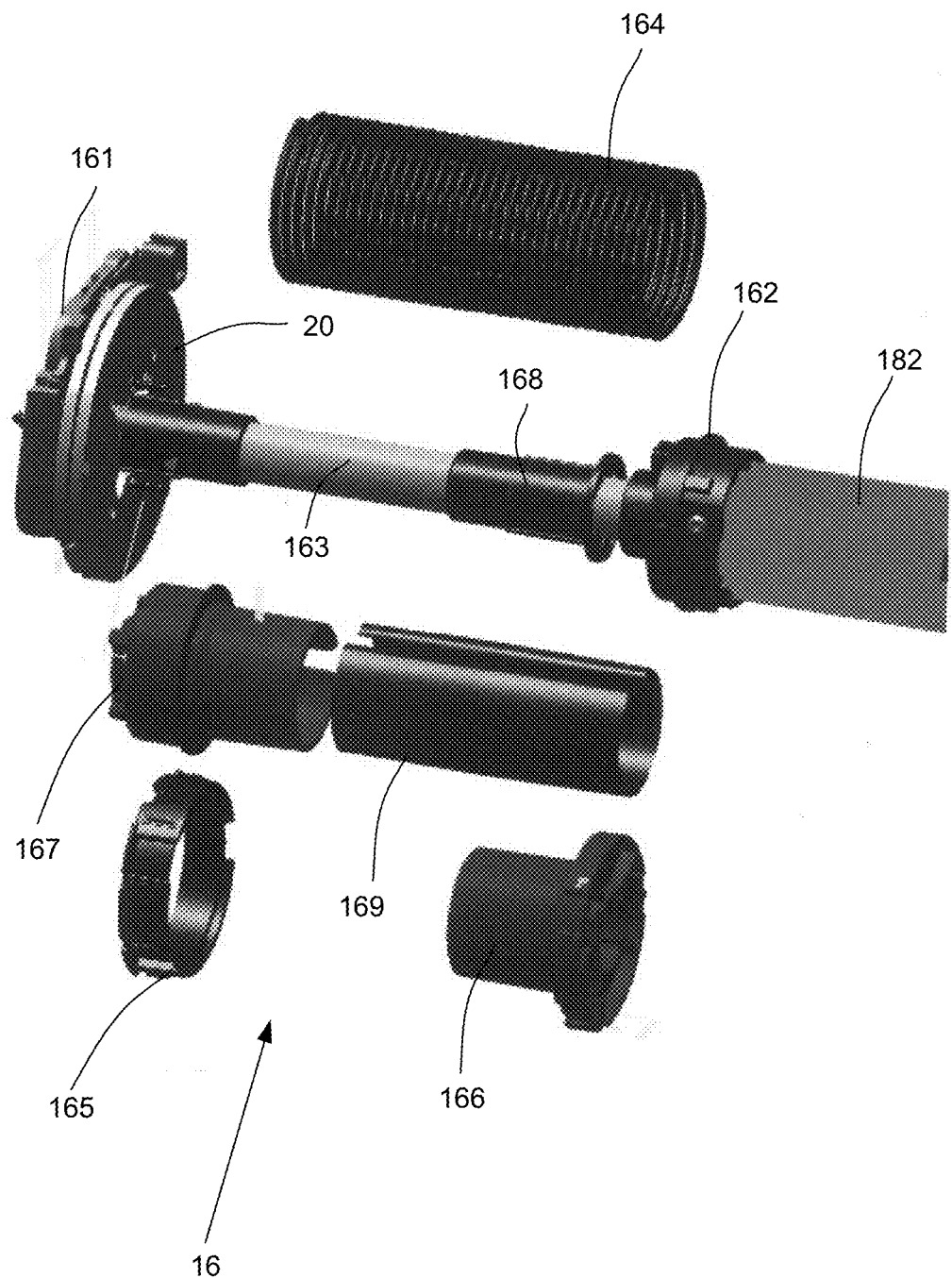
FIG. 5 is an exploded view of a first end section of the screening device of FIG. 1.

Referring also to FIG. 5, the end section 16 further comprises a spring element 164 having one end attached to a first rotatable holder 166 and the opposite end attached to a second rotatable holder 167 (FIG. 5), which in turn is attached fixedly to the winding wheel 20. A rotatable element 165 or ring is arranged on the second rotatable holder 167. The rotatable element 165 is freely rotatable with respect to the second rotatable holder 167. The rotatable element 165 is not attached to the spring element 164. The rotatable element 165 can thus rotate freely with respect to the spring element 164. The rotatable element 165 is in the assembled condition of the screening device 12 attached to the roller tube 15. The motor 18 is furthermore connected to and adapted for rotating the spring element 164. More particularly, the motor 18 is connected to the rotatable element 165, which in turn is connected to the roller tube 15 and the spring element 164 such that the motor 18 in operation may rotate the spring element 164. The spring element 164, the second rotatable holder 167 and the rotatable element 165 are arranged concentrically on the rod element 163 of the end section 16 between the end piece 161 and the inner piece 162. The first rotatable holder 166 is arranged concentrically on the rod element 163 of the end section 16, optionally on a seat or bearing 168, between the end piece 161 and the inner piece 162. Also, the winding wheel 20 is arranged concentrically with respect to the rod element 163 adjacent to the end piece 161. Furthermore, the rotatable holder 166 is in the assembled condition of the screening device 12 attached to an inner surface of the roller tube 15. The rotatable holder 166 can thus rotate with the roller tube 15.

Likewise, the end section 17 further comprises a spring element 174 having one end attached to a first rotatable holder 176 and the opposite end attached to a second rotatable holder (not visible), which in turn is attached to the winding wheel 20. A rotatable element 175 or ring is arranged on the second rotatable holder. The rotatable element 175 is not attached to the spring element 174. The rotatable element 175 is in the assembled condition of the screening device 12 attached to the roller tube 15. The spring element 174, the first rotatable holder 176, the second rotatable holder and the rotatable element 175 are arranged concentrically on the rod element of the end section 17 between the end piece 171 and the inner piece (not shown). Also, the winding wheel 20 is arranged concentrically on the rod element (not visible) adjacent to the end piece 171. Furthermore, the rotatable holder 176 is in the assembled condition of the screening device 12 attached to an inner surface of the roller tube 15. Thus, the motor 18 is likewise connected to and adapted for rotating the spring element 174.

Thus, the respective spring element 164, 174 and the respective winding wheel 20 may rotate together. The spring elements 164 and 174 are in an embodiment a helical spring. The spring elements 164 and 174 have an inherent pretension state.

One of the end sections 16 and 17, in the embodiment shown the end section 16, is furthermore connected to the motor 18. More particularly, the motor 18, in the embodiment shown (cf. FIG. 5) the printed circuit board 182 of the motor 18, is attached to the inner piece 162 of the end section 16 in a nonrotatable manner. Thereby, the inner piece 162, the printed circuit board 182 and the rod element 163 are connected in such a manner that they form one rigid element.

The rotatable element 165 and 175, respectively, as well as the end cap 184 are not attached to the spring element 164 and 174, respectively. The rotatable element 165 and 175, respectively, as well as the end cap 184 rotate, during operation of the motor 18 and thus during operation of the screening device 12, with the roller tube 15.

The first rotatable holder 166 and 176, respectively, and the respective second rotatable holder are attached to the spring element 164 and 174, respectively. The first rotatable holder 166 and 176, respectively, and the second rotatable holder 167 and 177, respectively, also rotate, during operation of the motor 18 and thus during operation of the screening device 12, with the roller tube 15. During rotation of first rotatable holder 166 and 176, respectively, and the second rotatable holder 167 and 177, respectively, the spring element 164 and 174, respectively, also rotates, namely in such a way that the opposite ends of the spring element 164 and 174, respectively, rotate in the same direction but at different speeds. The speed of rotation is dependent on the position of the bottom element 19 of the screening device 12.

Furthermore, when the screening body 14 is in the fully retracted position and is fully rolled up onto the roller tube 15, the diameter of the wire 21 on the winding wheel 20 is smaller than the diameter of the screening body 14 on the roller tube 15. When the screening body 14 is in a position midway between the fully retracted position and the fully extended position, the diameter of the wire 21 on the winding wheel 20 is approximately equal to the diameter of the screening body 14 on the roller tube 15.

Figure 6:
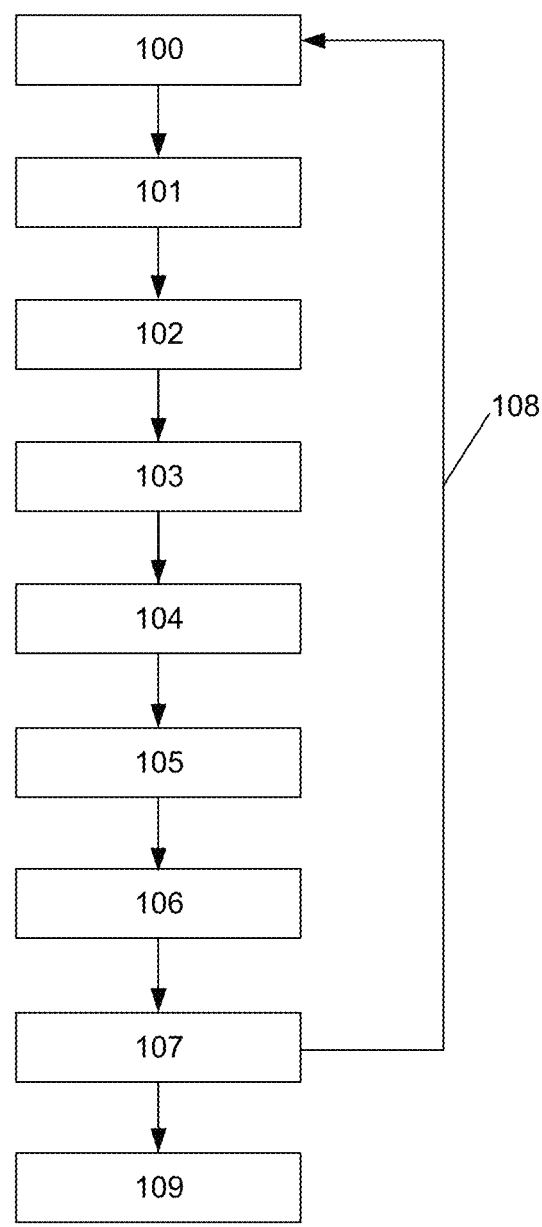
FIG. 6 is a diagram schematically illustrating a method according to the invention.

With reference now to FIG. 6, a method according to the invention for determining a fully extended position of a screening body of a screening device will be described. The method according to the invention is intended to be performed at least the first time after mounting that the screening body is moved from the fully retracted position to the fully extended position such as to calibrate the screening device. The method may be repeated at predetermined intervals during the life time of the screening device such as to recalibrate the screening device.

In a first step 100 the roller tube 15 of the screening device 12 is rotated by means of the electric motor 18 such as to drive the screening body 14 and the bottom bar or element 19 from the fully retracted position to the fully extended position of the screening body 14. In the fully extended position of the screening body 14 the first spring element 164 and the second spring element 174 will both be tensioned to a first tension level, $T_1$, due to the opposite ends of the spring element 164 and 174, respectively, being rotated in the same direction but at different speeds. Furthermore, in the fully extended position of the screening body 14, the bottom element 19 abuts the end stop 23. The first tension level, $T_1$, is above a tension level, $T_{IP}$, corresponding to the inherent pretension of the first spring element 164 and the second spring element 174.

In a second step 101 the electric motor 18 is stopped in reaction to a breaking current being detected. More precisely, the electric motor 18 is stopped when the current drawn by the electric motor 18 reaches a breaking current corresponding to a predetermined current level above the current level needed to drive the screening device 12 at standard operating conditions, i.e. at any position between the fully retracted position and the fully extended position. When the electric motor 18 is stopped in reaction to the said breaking current being detected, the first spring element 164 and the second spring element 174 will be tensioned to a second tension level, $T_2$, which is above the first tension level, $T_1$. Furthermore, when the electric motor 18 is stopped in reaction to the said breaking current being detected, the screening body 14 and the bottom element 19 will in effect be positioned a small distance beyond the fully extended position. Therefore, the screening body 14 may, to some extend be caused to hang.

In a third step 102 the number of revolutions, $R_d$, of the roller tube necessary to drive the screening body 14 and the bottom element 19 from the fully retracted position to the position of the screening body 1 at which the motor 18 is stopped in step 101 is measured by means of the tachometer 181 of the electric motor 18. The third step 102 is in practice performed during the performance of the first step 100.

In a fourth step 103 the measured number of revolutions, $R_d$, is transmitted to and stored in the data storage device of the control unit of the screening device 12. The control unit, and thus the data storage device, may be a unit separate from the electric motor 18, or it may be integrated on the printed circuit board 182 of the electric motor 18.

When the electric motor 18 is stopped as explained in the second step 101 above, a part of the tension of the spring elements 164 and 174 will subsequently automatically be released. Thereby, the screening body 14 will be pulled a short distance back towards the fully retracted position, thus causing the screening body 14 to be stretched. This release of tension may occur immediately upon stopping the electric motor 18, or it may alternatively occur following a delay in time with respect to the point of time at which the electric motor 18 is stopped.

Thus, in a fifth step 104 the number of revolutions, $R_b$, of the roller tube 15, that a release of a tension of the first spring element 164 and the second spring element 174 corresponding to the difference, $\Delta T$, between the first tension level, $T_1$, and the second tension level, $T_2$, will cause the roller tube 15 and thus the screening body 14 to move back towards the fully retracted position is measured by means of the tachometer 181 of the electric motor 18. The electric motor 18 is stopped or off during the performance of the fifth step 104. Also, the winding wheels 20 do not rotate or move during the performance of the fifth step 104.

In a sixth step 105 the measured number of revolutions, $R_b$, is stored in the data storage device of the control unit of the screening device 12.

Finally, in a seventh step 106 a value $R=R_d-R_b$ is calculated and stored in the data storage device of the printed circuit board 182.

Subsequently, the value R thus obtained is read by the control unit of the screening device 12 as corresponding to the screening body 14 being in its fully extended position and is used in subsequent operations of the screening body 14 to denote that the screening body 14 has reached its fully extended position.

In an optional eighth step 107 the number of operations of the screening device 12 are counted, and the first to seventh steps 100-106 are repeated 108 following the occurrence of a predetermined number of operations of the screening device 12 to obtain a corrected version, $R_{corr}$, of the value R. The predetermined number of operations of the screening device may be any suitable number upon which redetermination of the fully extended position of the screening body of the screening device may be needed, nonlimiting examples being 200, 500 or 1000 operations. The corrected version, $R_{corr}$, of the value R is stored in the data storage device of the printed circuit board 182 by replacing or overwriting the existing value R and/or a previously stored corrected version of the value R.

Still referring to FIG. 6, a method according to the invention for operating a screening device 12 may comprise performing the first to seventh steps 100-106 described above, and for operations following thereupon controlling 109 the electric motor 18 to drive the screening body 14 and the bottom element 19 from the fully retracted position to the fully extended position in dependence of the value R calculated and stored in the seventh step 106.

For instance, the electric motor 18 may be controlled to drive the screening body 14 and the bottom element 19 from the fully retracted position of the screening body 14 towards the fully extended position of the screening body 14 by moving the roller tube 15 a number of revolutions being equal to the value R or equal to a fraction of the value R calculated and stored in the seventh step 106.

The method for operating a screening device 12 according to the invention may in an alternative version comprise the steps of performing the first to eighth steps 100-107 described above, and for operations following thereupon controlling 109 the electric motor 18 to drive the screening body 14 and the bottom element 19 from the fully retracted position to the fully extended position in dependence of the corrected version, $R_{corr}$, of the value R calculated and stored in the eighth step 107.

For instance, the electric motor 18 may be controlled to drive the screening body 14 and the bottom element 19 from the fully retracted position of the screening body 14 towards the fully extended position of the screening body 14 by moving the roller tube 15 a number of revolutions being equal to the corrected version, $R_{corr}$, of the value R or equal to a fraction of the corrected version, $R_{corr}$, of the value R calculated and stored in the eighth step 107.

The person skilled in the art realizes that the present invention by no means is limited to the preferred embodiments described above. On the contrary, many modifications and variations are possible within the scope of the appended claims.

The invention claimed is:

1. A method for determining a fully extended position of a screening body of a screening device adapted for mounting on a frame structure, the frame structure comprising a top member and a bottom member as well as a pair of side members and the frame structure lining an opening in a building, the screening device (12) comprising:
    a top element (13), the top element comprising a roller tube (15), a screening body (14) attached to the roller tube, a first end section (16) comprising a first spring element (164) and a second end section (17) comprising a second spring element (174),
    a bottom element (19) attached to the screening body,
    an end stop (23) adapted for abutment with the bottom element in a fully extended position of the screening body, in which all of the screening body is rolled off of the roller tube,
    an electric motor (18) connected to and adapted for rotating the roller tube, the first spring element and the second spring element in order to drive the screening body between a fully retracted position, in which all of the screening body is rolled onto the roller tube and the fully extended position of the screening body while tensioning or relaxing the first spring element and the second spring element, the electric motor comprising a tachometer (181), and
    a printed circuit board for controlling the electric motor and storing data
    the method comprising the following steps:
    a) rotating (100), by means of the electric motor, the roller tube in order to drive the screening body and the bottom element from the fully retracted position to the fully extended position of the screening body, in which the first spring element and the second spring element are tensioned to a first tension level, $T_1$, and the bottom element abuts the end stop,
    b) stopping (101) the electric motor when a current drawn by the electric motor reaches a breaking current corresponding to a predetermined current level above the current level needed to drive the screening device, at which point the first spring element and the second spring element are tensioned to a second tension level, $T_2$, above the first tension level, $T_1$,
    c) measuring (102), by means of the tachometer, a number of revolutions, $R_d$, of the roller tube necessary to drive the screening body and the bottom element from the fully retracted position to the position of the screening body at which the motor is stopped in step b),
    d) storing (103) the measured number of revolutions, $R_d$,
    e) measuring (104) by means of the tachometer the number of revolutions, $R_b$, of the roller tube, that a release of a tension of the first spring element and the second spring element corresponding to a difference, $\Delta T$, between the first tension level, $T_1$, and the second tension level, $T_2$, will cause the roller tube to move back towards the fully retracted position,
    f) storing (105) the measured number of revolutions, $R_b$, and
    g) calculating and storing (106) a value $R=R_d-R_b$.

2. A method according to claim 1, wherein step e) includes performing the said measuring over a time span taking into account a delay in time with respect to a point of time at which the electric motor is stopped in step d), with which the release of a tension of the first spring element and the second spring element corresponding to the difference between the first tension level, $T_1$, and the second tension level, $T_2$, occurs or may occur.

3. A method according to claim 1, and comprising the further steps of
    counting a number of operations of the screening device performed, and
    repeating steps a) to g) following a predetermined number of operations of the screening device to obtain a corrected version, $R_{corr}$, of the value R.

4. A method according to claim 3, wherein the predetermined number of operations is 200, 500 or 1000.

5. A method according to claim 1, further comprising the step of:
    controlling the electric motor to drive the screening body and the bottom element from the fully retracted position of the screening body towards the fully extended position of the screening body based on the value R.

6. A method according to claim 5, wherein the step of controlling the electric motor to drive the screening body and the bottom element from the fully retracted position of the screening body towards the fully extended position of the screening body includes moving the roller tube a number of revolutions being equal to the value R or equal to a fraction of the value R.

7. A method according to claim 3, further comprising the steps of:
    controlling the electric motor to drive the screening body and the bottom element from the fully retracted position of the screening body to the fully extended position of the screening body based on the corrected version, $R_{corr}$, of the value R.

8. A method according to claim 7, wherein the step of controlling the electric motor to drive the screening body and the bottom element from the fully retracted position of the screening body towards the fully extended position of the screening body includes moving the roller tube a number of revolutions being equal to the corrected version, $R_{corr}$, of the value R or being equal to a fraction of the corrected version, $R_{corr}$, of the value R.

* * * * *